Mar. 13, 1923.

C. V. MIRICH

DIRECTION INDICATOR

Filed July 21, 1922

Inventor
Charley V. Mirich,

By
Attorney

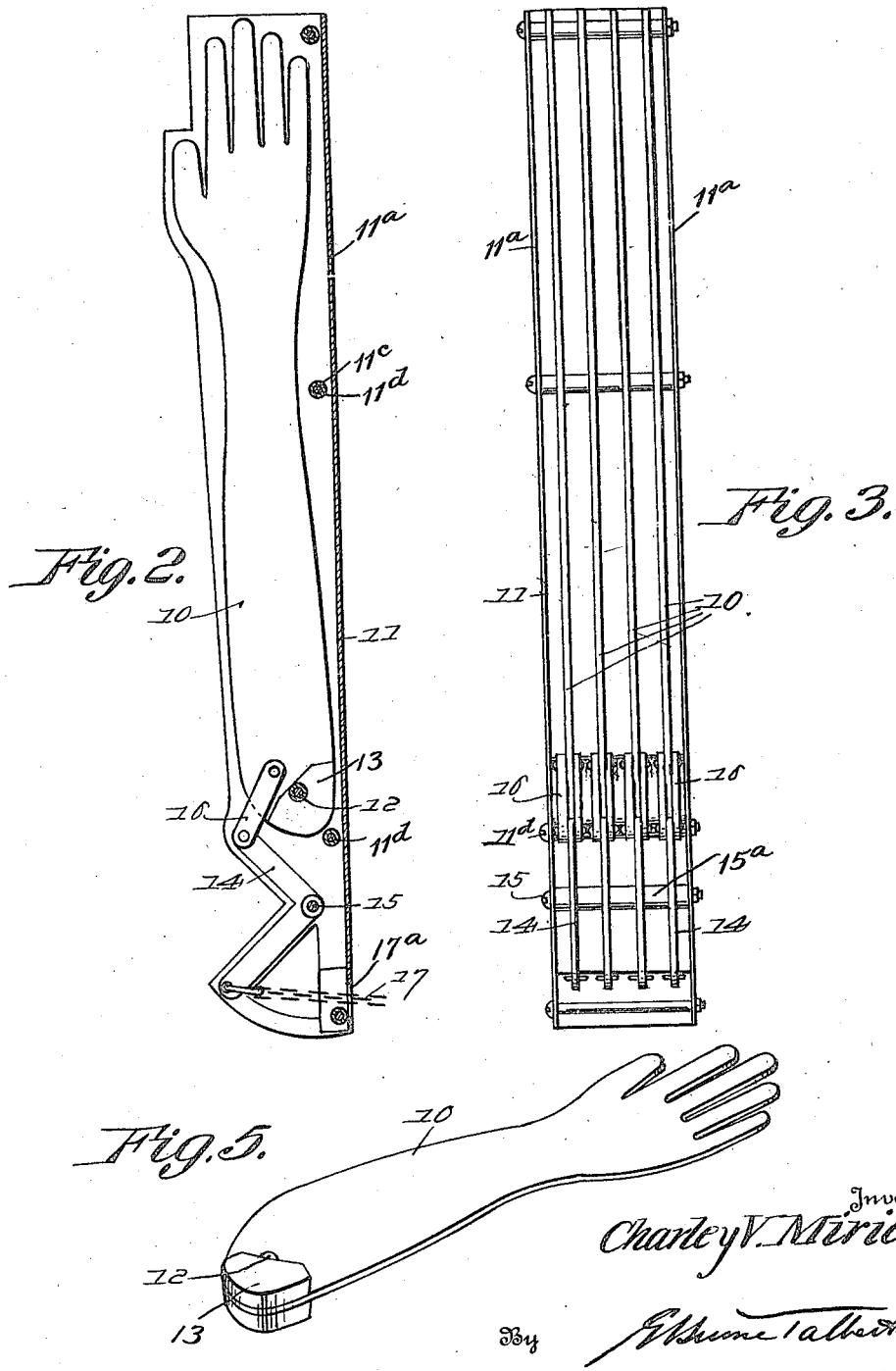

Patented Mar. 13, 1923.

1,448,561

UNITED STATES PATENT OFFICE.

CHARLEY VAYO MIRICH, OF GARY, INDIANA.

DIRECTION INDICATOR.

Application filed July 21, 1922. Serial No. 576,420.

*To all whom it may concern:*

Be it known that CHARLEY VAYO MIRICH, a citizen of the Kingdom of the Serbs, Croats, and Slovenes, residing at Gary, in the county of Lake and State of Indiana, has invented new and useful Improvements in Direction Indicators, of which the following is a specification.

The object of the invention is to provide a simple and efficient device applicable either to one or both sides of a vehicle, and more especially of the motor-driven type for clearly and unmistakably disclosing to pedestrians and the drivers of both following and approaching or other vehicles the intentions of the driver of the equipped vehicle with reference to stopping or changing the direction of travel as a means of guarding against accidents by collision and otherwise; and with these objects in view the invention consists in a construction and combination of parts of which a preferred embodiment is shown in the accompanying drawings, wherein:—

Figure 1 is an elevation of an indicating device embodying the invention arranged in the operative position on a vehicle, one of the signalling arms being shown in the extended position.

Figure 2 is a sectional view of the same.

Figure 3 is an edge view thereof.

Figure 5 is a perspective view of one of the pivotal arms.

Figure 1:
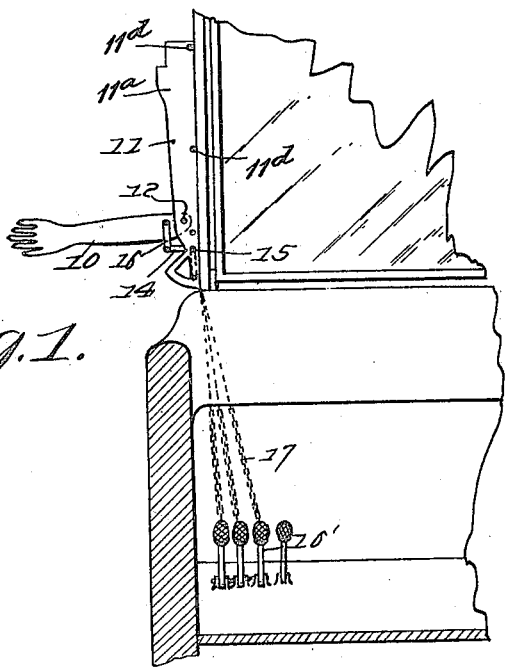

The device consists preferably of a plurality of pivotal arms 10 arranged in an open sided housing 11 consisting of the side plates 11$^a$ and the rear plates 11$^b$, transverse bolts 11$^c$ spanning the side plates 11$^a$ and carrying interposed standards 11$^d$. The arms are pivotally mounted at their lower ends upon a transverse shaft or pintle 12 and are counterweighted as shown at 13, the counterweights 13 consisting of elements disposed on opposite sides of the plates comprising the arms and being of a material of considerably higher specific gravity than the material of the arm.

Connected with each arm is an operating lever 14 of the bell-crank type and a whole set of levers 14 are pivoted on a transverse spindle or pintle 15, appropriate spacers 15$^a$ being carried on the pintle 15 and disposed between the levers and the sides of the casing to properly position the levers with respect to the signal arm, link connections 16 are provided for connecting the signal arms with one arm of the levers and these link connections comprise a pair of links disposed one on each side of the signal arm. Any suitable means may be employed for actuating the operating levers and preferably the actuating means comprise chains 17 terminally connected with the lower arms of the levers 14 and passing through openings 17$^a$ in the rear plate 11$^b$ of the casing, the remaining terminals of the chains being connected to foot pedals 16'.

Each arm is designed to carry a warning or directing signal or legend and the plurality of arms provides for giving a plurality of these directions, for example, "I'll stop", "I'll go across", etc. Depression of the selected pedal will result in a pull on its attached chain 17 with the result that the corresponding lever 14 will be operated to move the connected signal arm to a horizontal position. When there is no further need for the extension of the signal arm the release of the pedal will permit the arm to resume its normal position within the casing, the counterweight 13 operating to elevate the arm upon release of the pedal.

Figure 4:
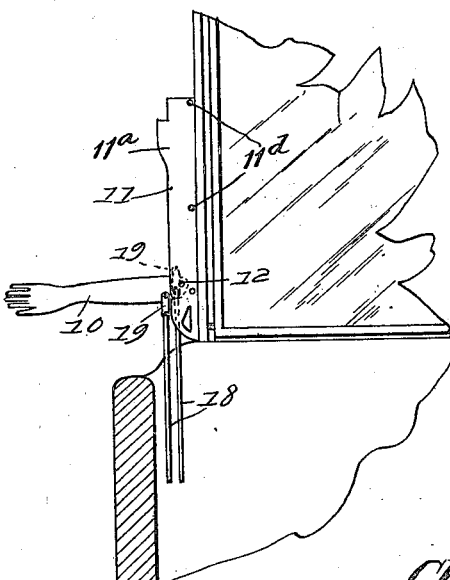
Figure 4 is a side view showing a modified construction of mounting of the arms adapted for actuation by a downward pull as distinguished from a horizontal or lateral pull.

In the modified construction shown in Figure 4 the operating lever 18 is attached directly to the arm and a link connection 19 is provided to adapt the arm to be extended by a downward pull as distinguished from the horizontal pull contemplated in the application of the form illustrated in Figure 1.

The casing may be attached in any suitable or permanent manner to the frame of the vehicle and preference of the driver as to the position of the indicating device.

When in housed condition, the indicating arms are wholly concealed both from the front and rear by the side plates 11$^a$ of the housing and are conspicuous so as to attract attention only when extended by the operation of the foot pedal or the pull rods 18.

Having described the invention, what is claimed as new and useful is:—

A direction indicator for vehicles comprising an open-sided casing consisting of spaced side plates and a connected back plate, transverse bolts spanning the side plates. spacers carried on said bolts and abutting end on against the side plates on the inner face, a plurality of signal arms for extension through the open side of the casing, a transverse pintle spanning the side plates and pivotally supporting the signal arms adjacent their lower ends, the signal arms being counterweighted adjacent the pintle for normally raising them into housed position in the casing, a plurality of bell-crank levers pivotally mounted in the casing and disposed respectively in the planes of the signal arms, link connections between the extremities of the bellcrank levers and the signal arms, and means for rocking the bell-crank levers to create a pull on the signal arms to extend them to horizontal positions.

In testimony whereof he affixes his signature.

CHARLEY VAYO MIRICH.